(12) United States Patent
Schneider

(10) Patent No.: US 9,036,236 B2
(45) Date of Patent: May 19, 2015

(54) MIRROR MODULE

(76) Inventor: Hartmut Schneider, Wiener Neudorf (AT)

( * ) Notice: Subject to any disclaimer, the term of this patent is extended or adjusted under 35 U.S.C. 154(b) by 344 days.

(21) Appl. No.: 13/703,747

(22) PCT Filed: Aug. 4, 2011

(86) PCT No.: PCT/EP2011/063424
§ 371 (c)(1),
(2), (4) Date: Dec. 12, 2012

(87) PCT Pub. No.: WO2012/025356
PCT Pub. Date: Mar. 1, 2012

(65) Prior Publication Data
US 2013/0083383 A1    Apr. 4, 2013

(30) Foreign Application Priority Data
Aug. 23, 2010    (AT) .................. A 1406/2010

(51) Int. Cl.
*G02B 26/08*    (2006.01)
*F24J 2/10*    (2006.01)
*F24J 2/54*    (2006.01)

(52) U.S. Cl.
CPC ........... *G02B 26/0816* (2013.01); *F24J 2/1047* (2013.01); *F24J 2002/108* (2013.01); *F24J 2/541* (2013.01); *F24J 2002/109* (2013.01); *Y02E 10/47* (2013.01)

(58) Field of Classification Search
CPC .......... Y02E 10/47; F24J 2/541; F24J 2/1047; F24J 2002/108; F24J 2002/109; G02B 26/0816
USPC ........... 359/225.1; 126/684–685, 605; 29/428
See application file for complete search history.

(56) References Cited

U.S. PATENT DOCUMENTS

| 3,861,379 A | 1/1975 | Anderson, Jr. ............... 126/271 |
| 5,542,409 A | 8/1996 | Sampayo ...................... 126/606 |
| 2010/0051016 A1 | 3/2010 | Ammar ......................... 126/600 |
| 2010/0071683 A1* | 3/2010 | Selig et al. ................... 126/605 |

FOREIGN PATENT DOCUMENTS

| CH | 700 099 | 6/2010 |
| DE | 20 2008 011 468 | 10/2008 |
| EP | 1 754 942 | 2/2007 |
| EP | 2 088 384 | 8/2009 |

OTHER PUBLICATIONS

International Search Report mailed Dec. 7, 2011 in corresponding PCT International Application No. PCT/EP2011/063424.

(Continued)

*Primary Examiner* — James Phan
(74) *Attorney, Agent, or Firm* — Ostrolenk Faber LLP

(57) ABSTRACT

The invention relates to a mirror module of a Fresnel Solar Collector System with a plurality of mirror elements pivotably mounted on a carrier plate and extending in parallel, which focus the sun light upon a receiver unit mounted above the mirror module in a raised position. The mirror elements are pivotably mounted on the carrier plate at least along longitudinal sections.

19 Claims, 7 Drawing Sheets

(56) References Cited

OTHER PUBLICATIONS

Figure 1:
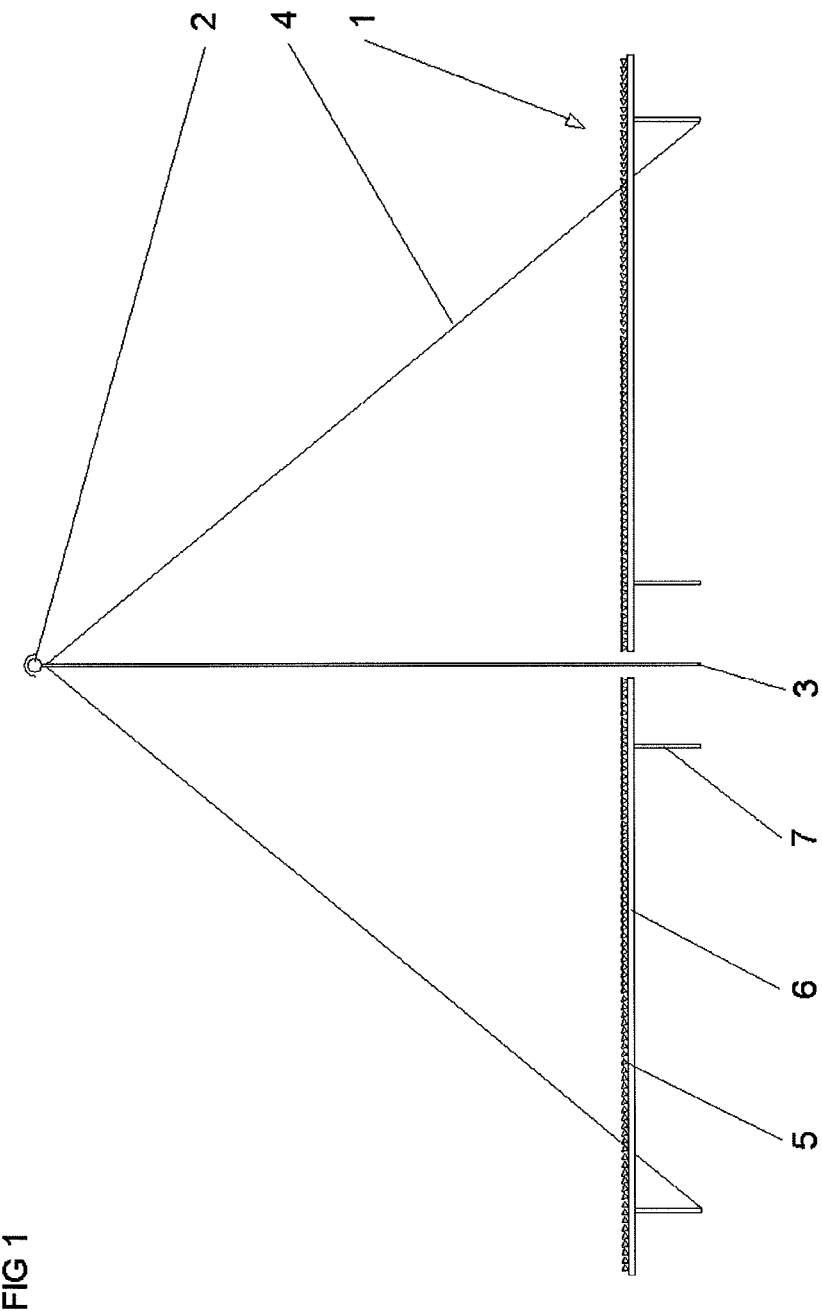

Written Opinion mailed Dec. 7, 2011 in corresponding PCT International Application No. PCT/EP2011/063424.

International Preliminary Report on Patentability (IPRP) dated Feb. 26, 2013 for International Application PCT/EP2011/063424.

* cited by examiner

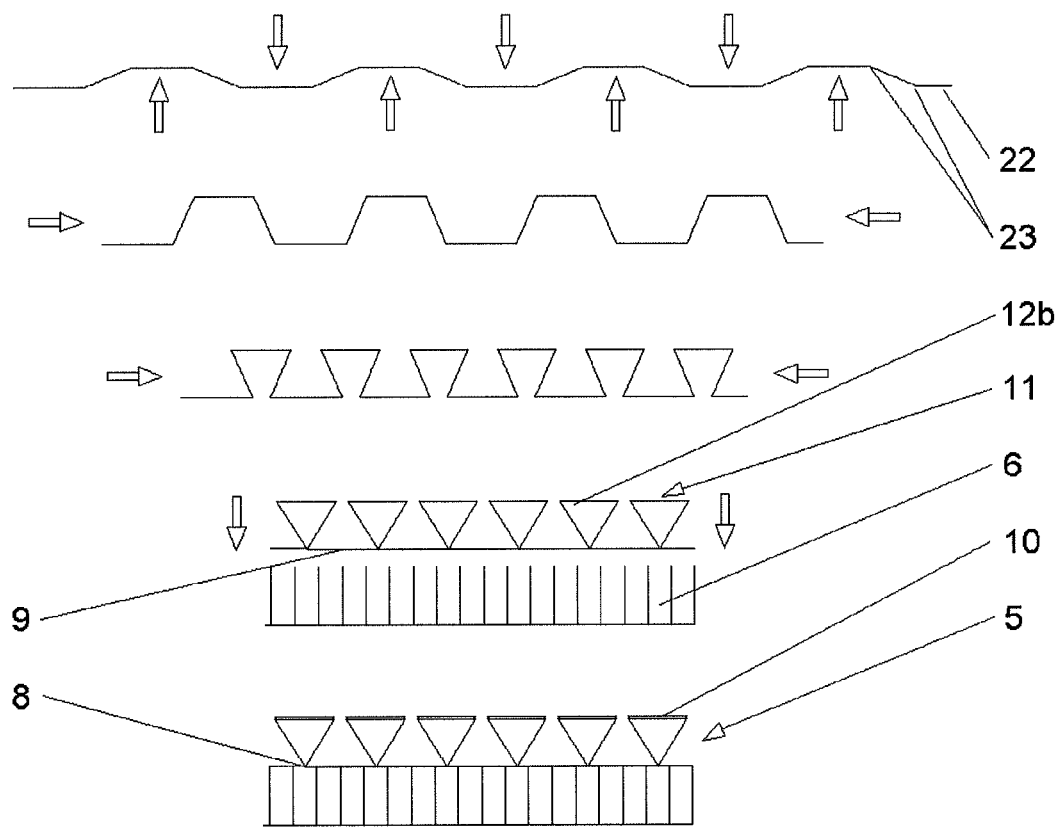

MIRROR MODULE

CROSS-REFERENCE TO RELATED APPLICATIONS

The present application is a 35 U.S.C. §§371 national phase conversion of PCT/EP2011/063424, filed Aug. 4, 2011, which claims priority of Austria Patent Application No. A 1406/2010, filed Aug. 23, 2010, the contents of which are incorporated herein by reference. The PCT International Application was published in the German language.

The invention relates to a mirror module of a Fresnel Solar Collector System with a plurality of mirror elements pivotably mounted in parallel on a carrier plate, which elements focus the sun light upon a receiver unit mounted above the mirror module in a raised position.

DESCRIPTION

Prior Art

As a rule Fresnel Solar Collector Systems are used in thermal power plants for the generation of power. It is however possible to also use Fresnel Solar Collector Systems for the generation of process heat in water desalinating plants, or for the generation of power with Sterling motors or in photovoltaic plants.

Fresnel Solar Collector Systems have been known in the art for a long time. These systems are characterised by a large number of elongated, mostly flat or slightly curved mirrors which individually bundle and direct the sun light to a linear receiver. To this end the mirrors are made to track the sun about their longitudinal axis. As a rule several mirrors are combined to form a group and they are coupled via rods so as to be moved by a common drive.

As such a Fresnel Solar Collector System is described in the U.S. Pat. No. 3,861,379, which comprises several flat mirrors coupled together and controlled via a drive.

In the U.S. Pat. No. 5,542,409 a Fresnel Solar Collector System has been disclosed, which aligns a number of mirrors arranged axially one behind the other so as to follow the position of the sun via a gearing mechanism and a coupling rod.

The EP-A-1754942 describes a supporting frame for a Fresnel Solar Collector System with pivotable, coupled-together mirrors and secondary mirrors arranged directly above the receiver.

In the EP A 2088384 a solar power plant with an adjustment mechanism is described, the mirror elements of which have a length of up to 100 m and a width of between 10 cm and 25 cm and which are pivotably mounted on a carrier plate.

In all four documents the pivotable mirror elements are supported at both ends, respectively.

PROBLEM DESCRIPTION

An essential problem with known industrially economic Fresnel Solar Collector Systems consists in accurately adjusting each individual mirror during installation in situ. The mirrors are coupled together mechanically such that they can follow the path of the sun via a common group drive. The individual mirror elements must be coupled together with a high degree of adjustment accuracy in order to be able to achieve good optical efficiency. Since assembly, due to the size of conventional mirror elements of Fresnel Solar Collector Systems, must take place on site, accurate adjustment of the coupling is sometimes difficult to accomplish or requires a great amount of time and a large number of personnel. Inaccurately adjusted mirrors substantially reduce the efficiency of the plant.

A further problem is the reduction of optical efficiency which is caused by the width of the mirrors. This problem leads to the necessity of having to provide a second mirror, which, although reflecting those rays missing the receiver the first time and bundling and directing these to the receiver the second time round, reduces the efficiency of the system precisely because of this second reflection. This is due to the fact that the mirrors are wider than the receiver tube. A reduction in the width of the mirrors would increase the yield from the sun rays incident directly upon the receiver by a simple reflection on the primary mirror, but makes it necessary to have a larger number of mirrors. Narrower mirrors, as a rule, in parallel also cause a reduction in cross-section of the supporting body and thus a reduction in stiffness of the same. This reduction in stiffness, for a constant maximum bending, makes it necessary to shorten the mirror elements supported at the ends which again increases the costs of the system. Another possibility would be to make the supporting body stronger relative to a smaller mirror width, but this again would lead to an increase in costs of the system. For both variants it is true to say that fitting mirror elements of smaller width and in larger numbers in situ would increase assembly costs and thus noticeably lower the operating efficiency of the plant.

Fresnel Solar Collector Systems compared to other concentrated solar collector system such as linear parabolic mirror collector systems, are less affected by wind. All the same, the robustness and strength of the way in which the mirrors are supported as well as the construction of the coupling systems and the associated actuators even for Fresnel Solar Collector Systems, is defined, in the main, by the wind forces impacting on the mirror elements. A further reduction in wind-attack area would lead to even smaller coupling systems and smaller associated actuators, which would make it possible to lower the overall costs of the mirror module.

Fresnel Solar Collector Systems are used for the generation of steam and, apart from power plants for the generation of electricity, can also be used in the industry as alternative systems for the generation of process steam. In this respect it is advantageous to utilise existing roof surfaces of storage and production plants as installation sites. Conventional systems, as a rule, consist of glass mirrors mounted on steel carrier bodies and supported by steel girder systems. Such systems are very heavy as a whole. In order to keep reinforcements of existing building support structures at a minimum, it is expedient to develop a Fresnel Solar Collector System of low overall weight. In addition lighter systems simplify handling during the overall product life cycle, especially during transportation and its assembly on site.

SOLUTION/INVENTION

Based on the prior art the invention is based on the requirement of developing a prefabricated high-precision mirror module, the moving parts of which comprise a small wind-attack area, and which is characterised by high optical efficiency in that it directly focusses upon the receiver tube, and by being light in weight and easy to assemble.

According to the invention this requirement is met in that the mirror elements are pivotably mounted on the carrier plate at least along longitudinal sections.

Advantageous embodiments and further developments are the subject of sub-claims.

In particular the mirror elements are pivotably mounted on the carrier plate at least substantially along their entire length.

Due to the mounting according to the invention the mirror elements can be manufactured so as to be low in weight and with reduced material input. With the invention the supporting function is performed by the stationary rigid carrier plate, the function of mirroring the sun light upon the receiver unit by the pivotable mirror elements. The separation of functions according to the invention makes it possible to construct the pivotable mirror elements tracking the sun in a narrow fashion but so that they extend a long way in axial direction and are extremely light in weight. Further the pivotable mounting of each mirror element is achieved, according to the invention, by using at least one film hinge which in a preferred embodiment extends along a large part of the length of the mirror element and thus always delivers appropriate support and alignment.

The carrier plate itself is preferably of lightweight construction, which apart from the mirror elements also carries the connection unit and the drive for tracking the sun. Adjustment of individual mirror elements, attachment of the connection unit and assembly of the drive may thus be carried out by machine in the factory under optimal conditions, where good quality control can be performed. This ensures that a functional and high-precision complete mirror module is delivered which merely requires to be aligned with the receiver unit on site.

The width of the mirror elements can then be chosen such that at most it corresponds to the diameter of the receiver unit, in particular is less than the diameter of the receiver unit, and that thus all the reflected sun light directly hits the receiver unit without any secondary mirrors. This increases the optical efficiency of the system as a whole. Furthermore, the narrow width means that the wind attack surface of the moving parts is very small, resulting in a low material input and a small drive unit during implementation. Apart from cost savings during manufacture and during transport assembly is also made easier.

Due to this extremely light and material saving construction preferred installation sites of the Fresnel Solar Collector System are flat roof surfaces. Due to the carrier plate, connection to the roof can be selectively effected in those places where support profiles and reinforcements exist below the roof surface.

According to the invention edge strips may be present on the outside of the mirror modules which fulfil several functions. On the one hand the edge strips offer an additional wind covering for the mirror elements on the outside, on the other, due to their height, they enable the mirror modules to be stacked one above the other without the mirror elements touching one another. Preferably the edge strips are equipped with handles and lugs for easy handling during assembly as well as with channels for receiving a cleaning carriage. Additionally provided integrated pins and corresponding recesses prevent slippage of the mirror modules in case they are stacked one above the other during storage or transportation.

DESCRIPTION

Figure 2A:
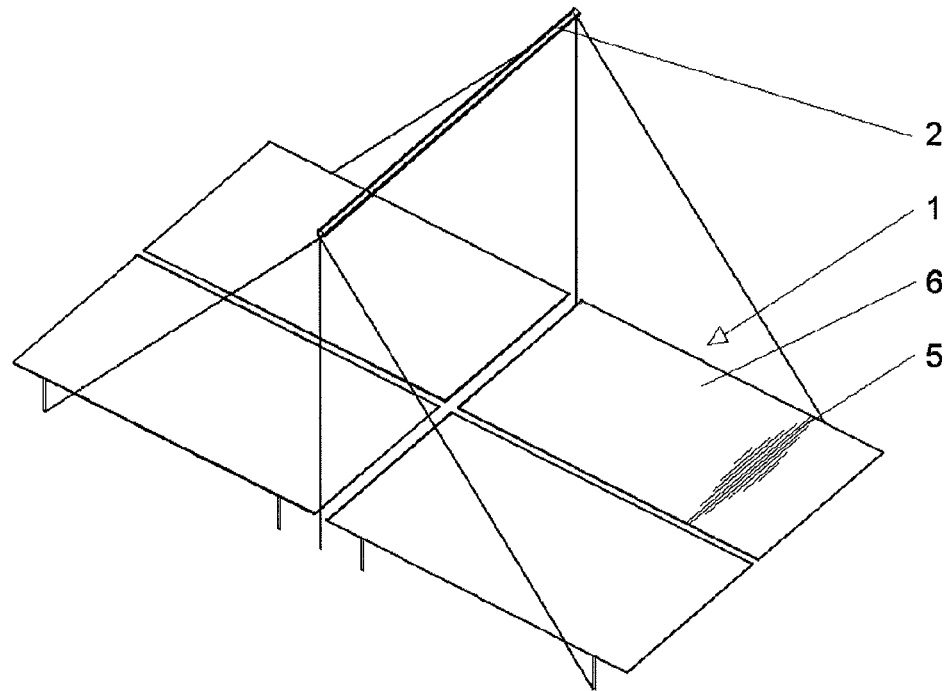
Figure 2B:
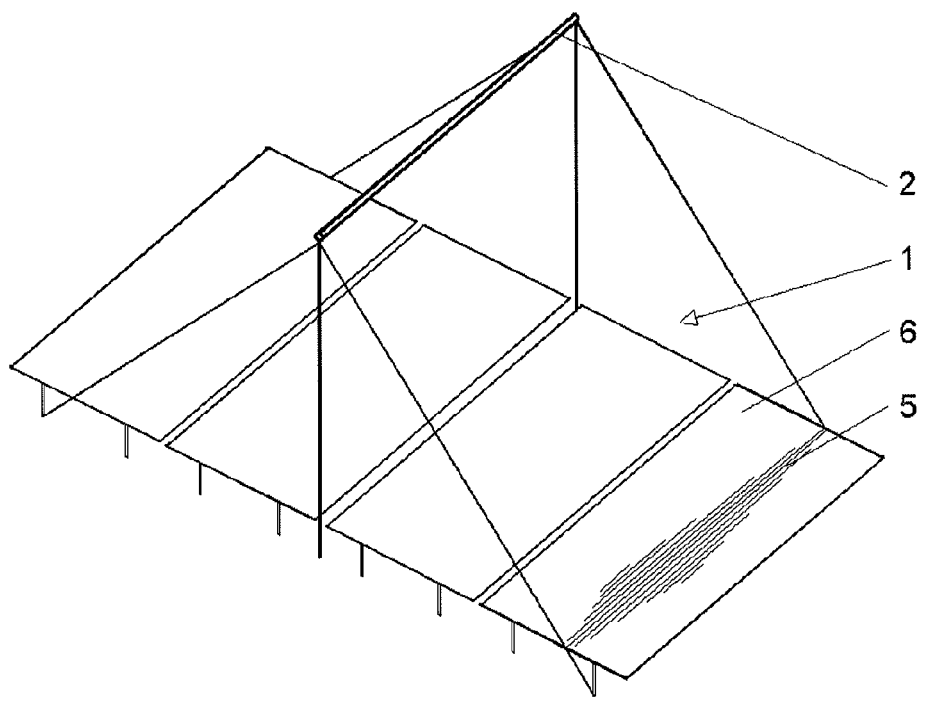
Figure 3:
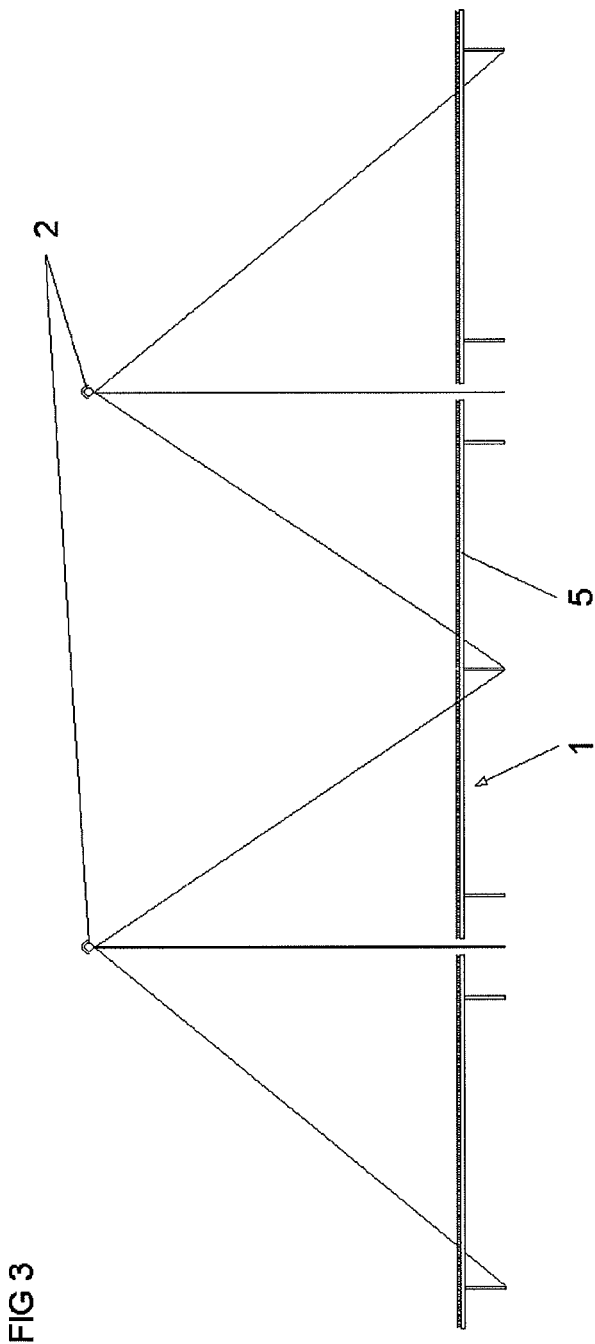
Figure 4:
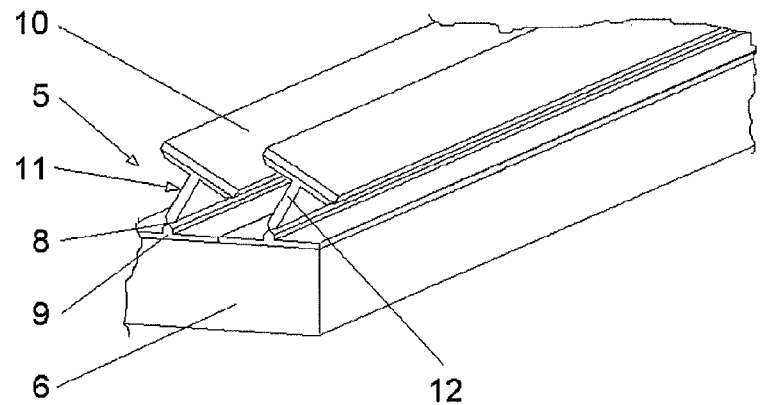
Figure 5:
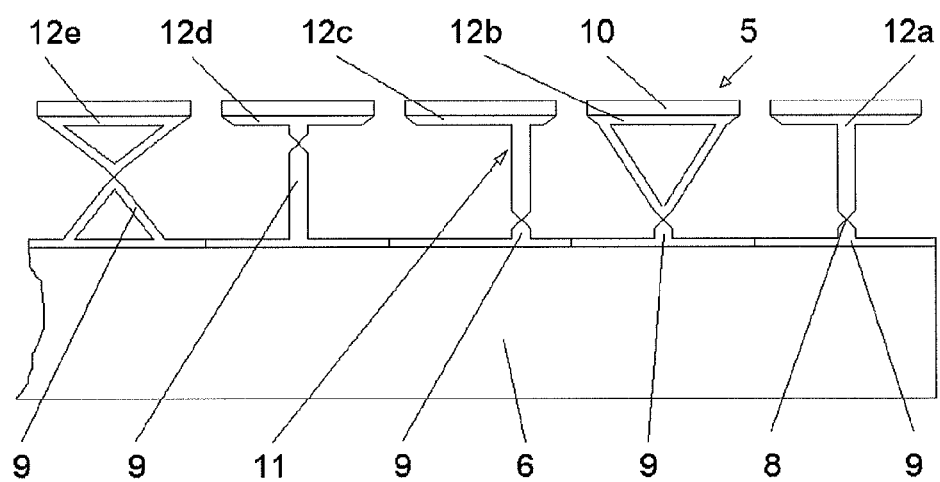
Figure 6:
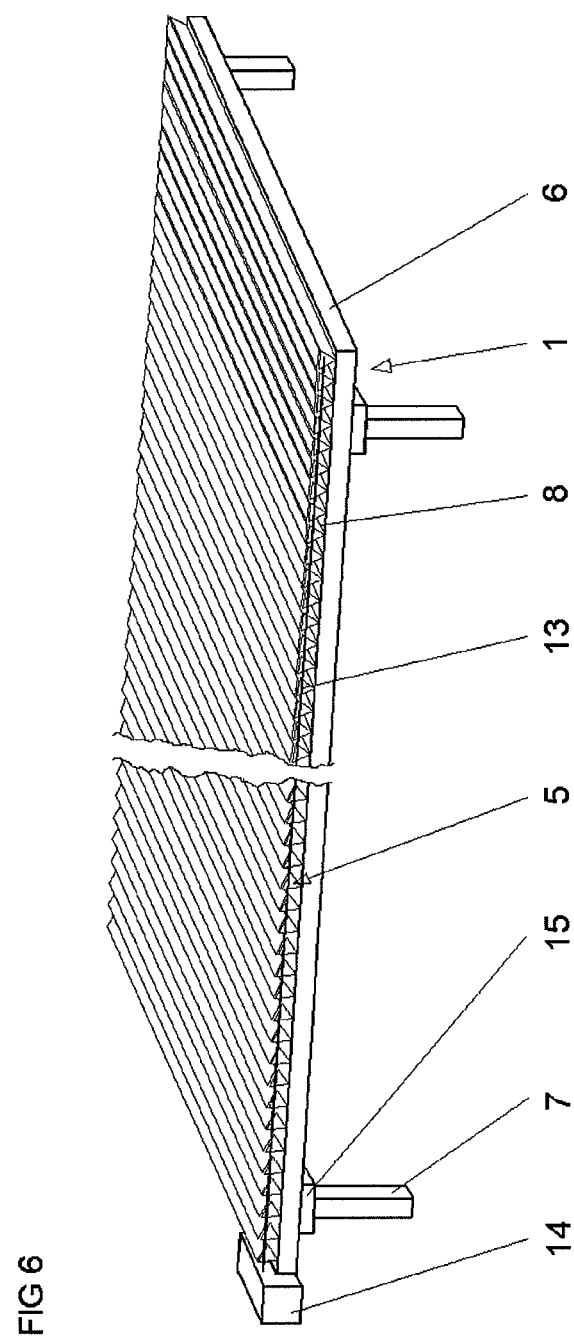
Figure 7:
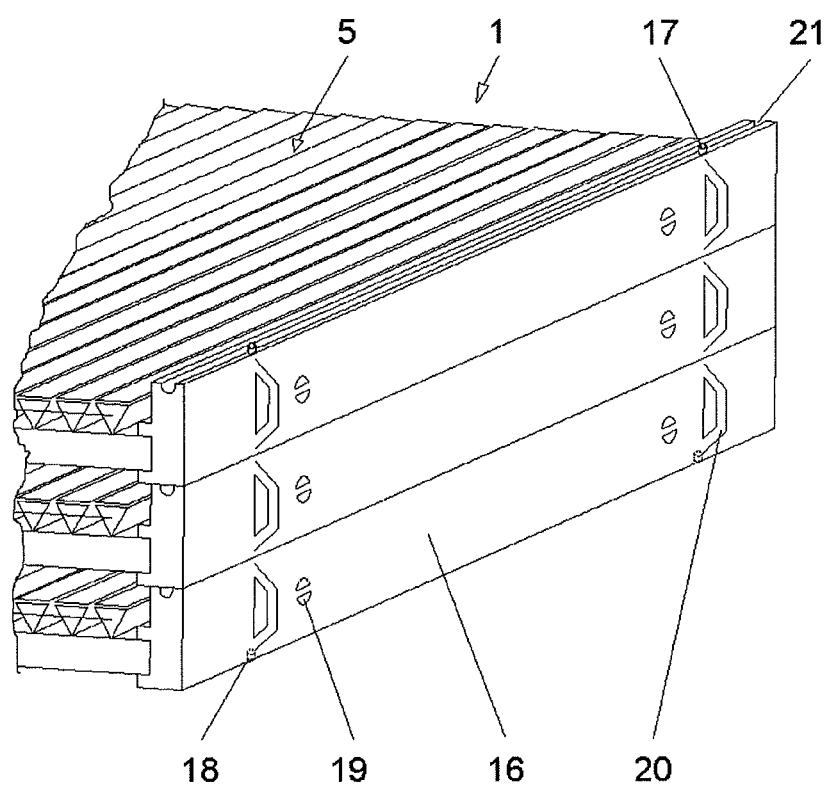

The invention will now be described with reference to exemplary schematic sketches, in which FIG. 1 shows a Fresnel Solar Collector System, FIGS. 2a and 2b show various ways of aligning the mirror modules, FIG. 3 shows an interleaved Fresnel Solar Collector System, FIG. 4 shows mirror elements, FIG. 5 shows variants of mirror element cross-sections, FIG. 6 shows coupled-together mirror elements, FIG. 7 shows stacked mirror modules with edge strips, and FIG. 8 shows manufacturing steps of mirror elements triangular in cross-section.

The Fresnel Solar Collector System in FIG. 1, in the main, consists of mirror modules 1 according to the invention which focus the incident sun light upon the receiver unit 2 which is arranged at a height of several meters above the mirror module 1. The receiver unit 2 can be attached, according to the invention, via rods 3 and wire ropes 4 in such a way that even when it is windy and the sun shines it is generally fixed firmly in position. According to the invention the mirror module 1 consists of mirror elements 5 which are pivotably mounted on a carrier plate 6 substantially along the entire length, but at least in sections. The carrier plate 6 is mounted, precisely aligned with the receiver unit 2, via supports 7 anchored in the ground. The carrier plates 6 can be mounted, in an alternative embodiment according to the prior art, on a supporting system instead of on individual supports 7. The carrier plate 6 is of lightweight construction, and may be constructed either as a composite plate with foamed core, as a honeycomb core plate or in any other way, but so as to be light in weight and very rigid. As regards thermal expansion of the materials however, this shall be similar to that of the material of the mirror elements 5.

The size of the mirror modules is generally adapted to suit the dimensions of standard transport means, but in principle can also comprise other dimensions suited to the respective application. Due to such standard transport means as containers or lorries this usually results in elongated rectangular mirror modules 1 of approx. 3 m×approx. 12 m, for example. However, for certain applications it may be convenient to choose other sizes. The individual mirror modules 1 may then be arranged along the receiver unit 2 both in parallel such as shown in FIG. 2a, or normal to the longitudinal side of carrier plate 6, as sketched in FIG. 2b. The position of the mirror elements 5, however, is always such that these extend in parallel with the receiver unit 2. Depending upon the desired concentration and the height of the receiver unit 2 several mirror modules 1 may be arranged in parallel with each other in both embodiments.

As with known Fresnel Solar Collector Systems the receiver units 2, as shown in FIG. 3, may also be arranged such that these extend at a defined distance in parallel with each other, and that one part of the mirror elements 5 arranged between the two receiver units 2 is associated with one receiver unit 1 and the other part is associated with the other receiver unit 2. Due to associating the mirror elements 5 alternately with the left-hand and right-hand receiver units 2 efficiency is increased because individual mirrors don't throw less shade upon each other. This known optimised arrangement may also be implemented using the present mirror module 1 according to the invention.

FIG. 4 shows how mirror elements 5 are mounted according to the invention on the carrier plate 6 by means of film hinges 8. These film hinges 8 extend either across sections of lengths of mirror elements 5 or across the entire or a large part of the length of mirror elements 5, and they are mounted on the carrier plate 6 such that they cannot bend through or can bend only together with the carrier plate 6. The resulting dimensional stability ensures high optical efficiency of mirror module 1. The mirror elements 5 thus comprise a supporting element 11 consisting of a foot element 9 and a mirror supporting portion 12 which are flexibly connected with each other via a film hinge 8. On the top of the mirror supporting portion 12 is a mirror surface 10 consisting, in particular, of an optically good reflective coating, a reflective foil or a thin glass mirror. The supporting element 11 of mirror elements 5, in one embodiment of the invention, consists of a plastic profile so that the mirror supporting portion 12 with film hinge 8 and foot element 9, forms a single component. The supporting element 11 may be arranged on the carrier plate 6 along the entire length of mirror elements 5 by means of a film hinge 8 and a foot element 9, or it may be equipped with film hinges 8 in sections together with foot elements 9 in sections or with one single foot element 9 extending along the length of the supporting element. The film hinge 8 may be provided either in the lower area of the mirror element 5, at or near the carrier plate 6, or in the central or upper area of the mirror element 5, but it must allow at least such a tilting angle of mirror element 5 that the sun rays across a whole day are directed at the receiver unit 2. The tilting angle depends upon the geometry of the Fresnel Solar Collector System as well as upon the alignment of the receiver unit 2 with the four directions of the compass, but as a rule it should allow a value of about 90°. An embodiment with a tilting angle of over 90° could be meaningful if the mirror surface 10 shall be able to be pivoted beyond a vertical position in order to guard against weather influences. The width of the mirror elements 5 ranges from a few millimeters to about 100 mm, corresponding to the diameter of the receiver unit 2, in particular the width of mirrors 10 or mirror elements 5 corresponds to, at most, the diameter of the receiver unit 2. The length of mirror elements 5 depends upon the arrangement and dimensions of mirror modules 1 resulting in the mirror elements 5 reaching across the entire length of mirror modules 1. Resulting lengths could be, for example, 3 m to 12 m.

The different cross-sectional shapes of mirror supporting portions 12 and 12a to 12e of mirror elements 5 shown in FIG. 5 depend upon the position of film hinge 8 and the size of mirror elements 5 and shall comprise a very high torsional resistance. This ensures that when a tilting movement occurs, the mirror surface 10 remains dimensionally stable across the entire width. The mirror supporting portion 12a has a T-shaped profile, the cross-sectional shape of mirror supporting portion 12b is triangular, the cross-sectional shape of mirror supporting portion 12c is L-shaped. The mirror supporting portion 12d is T-shaped with a film hinge 8 lying close to the mirror surface 10. The mirror supporting portion 12e forms an X in cross-section together with foot element 9. The connection between foot element 9 and carrier plate 6 may be effected either via a groove and tongue system, by gluing, riveting or screwing, or by any other type of connection as defined in the art.

Tracking of the linear mirror elements 5 is preferably effected as defined in the art by coupling the same to each other by means of a connecting unit 13 shown in a simplified form in FIG. 6. The connecting unit 13 connects all or a group of mirror elements 5 of mirror module 1 with a drive 14 which can be kept small due to the weak wind forces impacting on the small mirror elements 5. The connecting unit 13 and the drive 14 may be positioned on the edge or even in the centre of respective mirror module 1. The drive 14 can be attached, via recesses or by running it past the sides, in the centre of the carrier plate 6 or on the underside of carrier plate 6. The choice of position of the connecting point between mirror element 5 and connecting unit 13 shall be such as to ensure as much distance as possible, and thus a lot of leverage, from the axis of the film hinge 8 in order to ensure conformity and thus good optical efficiency of the solar collector system. Advantageously the drive 14 may be implemented as an electrical linear drive with a self-locking spindle, or it may comprise any other type of drive such as a pneumatic or hydraulic drive, or it may be a direct drive or a drive via a gear mechanism. Due to attaching the mirror elements 5, the connecting unit 13 and the drive 14 to the carrier plate 6, a complete ready-for-use and transportable mirror module 1 is produced which can be manufactured in the factory, in particular with the aid of robots. Quality testing of the optical accuracy of mirror module 1 can therefore also be carried out immediately during and after manufacture so that alignment during installation on site is limited to the precise positioning of the mirror module 1. There is no need for readjusting the mirror elements 5 themselves or the connecting unit 13 with drive 14, a fact which simplifies and accelerates installation of the entire solar system.

Fixing the mirror modules 1 on the supports 7 is effected, according to the invention, by fixing elements 15 attached to the carrier plate 6, thereby permitting an easy and quick assembly on the one hand and ensuring high adjustment accuracy on the other.

Although the impact of the wind upon the moving parts is very small due to the narrow mirror elements 5, the wind attack surfaces of the linear mirror elements 5 on the outside may still be covered, for example by edge strips 16 as shown in FIG. 7. Furthermore these edge strips 16 may exercise a protective function for the mirror elements 5 when stacking several mirror modules 1 during storage or during transport. According to the invention this is achieved in that the edge strips 16 reach further in an upward or downward direction by an amount greater than the extent of a possible bending-through of the mirror elements 5 or of the carrier plate 6 for a static load or even a dynamic load during transport. If several mirror modules 1 are stacked on top of each other, only the edge strips 16 come to lie on top of each other without any other parts of the mirror module 1 coming into contact with one another. Pins 17 attached to the edge strips 16 or pimples and their corresponding recesses 18 on the other edge of the edge strips 16 permit an accurate positioning of individual mirror modules 1 one above the other and in addition, prevent slippage and thus damage to the same. In addition lugs 19 may be provided in the edge strips 16 for receiving lifting slings or hooks for lifting the mirror modules 1 using various lifting tools. Manual ancillary positioning during stacking and assembly is considerably simplified by handles 20 integrated with the edge strips 16.

The cleaning of mirror elements 5 may be effected by a cleaning carriage movable via the mirror module 1. To this end a corresponding distance may be provided at two or more points between the mirror elements 5 with a channel 21 being provided in the carrier plate 6 for receiving and guiding a cleaning carriage. Alternatively the channels may be formed on the edge of the carrier plate 6. In an alternative design this channel 21 may be implemented as an integral part of the laterally provided edge strips 16. In both cases the channel may be designed as a rail or a profile guide. In order to protect the mirror elements 5 not only against the wind but also against other weather conditions, a light-transparent covering of glass or plastic may be provided on each mirror module 1.

FIG. 8 schematically shows a manufacturing method according to the invention of the mirror elements 5 with triangular mirror supporting portions 12b made from a plate 22 consisting of plastic, or fibre-reinforced plastic or, in particular, cardboard stiffened by a hardening agent. At defined intervals the plate 22 is provided with several kinks 23 extending in parallel, wherein some of the kinks 23 later act as film hinges 8. Therefore the material must be dimensionally stable on the one hand and flexible and weather-resistant at the kinks 23 on the other. After kinking, the individual portions are turned in the respectively desired direction, and at the same time the plate 22 is pushed together from the side. The tooth-shaped cross-section thus being formed obtains the desired cross-section by being pushed together still more. This has the effect of forming interconnected supporting elements 11 with mirror supporting portions 12, foot elements 9 and film hinges 8. This structure, by attaching, preferably by gluing it to a ready-made composite plate or a composite plate still open on the top, can then be assembled with mirror elements 5 to form the desired lightweight carrier plate 6. Depending on the application the mirror surface 10 implemented as a reflective coating, film or glass mirror can be applied before or after this production step.

LIST OF REFERENCE SYMBOLS 1 mirror module
2 receiver unit
3 rod
4 wire rope
5 mirror element
6 carrier plate
7 support
8 film hinge
9 foot element
10 mirror surface
11 supporting element
12 mirror supporting portion
12a-e mirror supporting portion
13 connecting unit
14 drive
15 fixing element
16 edge strip
17 pin
18 recess
19 lug
20 handle
21 channel
22 plate
23 kink

The invention claimed is:

1. A mirror module of a Fresnel Solar Collector System with a plurality of mirror elements pivotably mounted in parallel on a carrier plate, which focus the sun light upon a receiver unit mounted above the mirror module in a raised position,
    wherein the mirror elements are pivotably mounted on the carrier plate at least along longitudinal sections.

2. The mirror module according to claim 1, wherein the mirror elements are pivotably mounted on the carrier plate at least substantially along their entire length.

3. The mirror module according to claim 1, wherein the pivotal mounting of the mirror elements is implemented as a film hinge.

4. The mirror module according to claim 1, wherein the mirror elements comprise a supporting element made up of a mirror supporting portion and a foot element connectable with the carrier plate, wherein the mirror supporting portion is connected with the foot element via the at least one integrated film hinge.

5. The mirror module according to claim 4, wherein the supporting element is a profile substantially consisting of plastic, wherein the mirror supporting portion comprises a T-shaped, L-shaped or triangular cross-section.

6. The mirror module according to claim 4, wherein on the side of the supporting element facing the sun a mirror surface is applied, which is implemented as a reflective coating, a glued-on reflective foil or a glass mirror.

7. The mirror module according to claim 6, wherein the mirror surface comprises a width, which at most corresponds to the diameter of the receiver unit.

8. The mirror module according claim 1, wherein the carrier plate is implemented as a lightweight construction, comprising a material compound plate or a honeycomb core plate.

9. The mirror module according to claim 1, wherein the pivotable mirror elements are mechanically coupled together via at least one connecting unit and via the connecting unit can be made to track the sun with the aid of a drive.

10. The mirror module according to claim 9, wherein the mirror elements are aligned in parallel or normal to the longitudinal side of the carrier plate and together with the connecting unit and the drive form a prefabricated unit which can be transported.

11. The mirror module according to claim 1, wherein a gap is formed between mirror elements or on the side in at least two places as a channel for a cleaning carriage on the carrier plate.

12. The mirror module according to claim 1, wherein an additional light-transparent covering of glass or plastic is attached above the mirror elements for protecting the mirror elements against adverse weather conditions.

13. The mirror module according to claim 1, wherein the carrier plate comprises fixing elements on supports for quick attachment and subsequent fine adjustment.

14. The mirror module according to claim 1, wherein the carrier plate comprises an edge strip on at least two of its sides protruding beyond the mirror elements.

15. The mirror module according to claim 14, wherein the upper or lower edges of the edge strips comprise pins or pimples and corresponding recesses such that several mirror modules can be stacked one upon the other and be secure against slippage.

16. The mirror module according to claim 14, wherein lugs and handles are arranged on the edge strips, enabling lifting tools to be attached for transport and assembly, and for ancillary manual positioning to be possible.

17. The mirror module according to claim 14, wherein the edge strips comprise channels for receiving a cleaning carriage.

18. A method for manufacturing a mirror module of a Fresnel Solar Collector System with a plurality of mirror elements pivotably mounted in parallel on a carrier plate, which focus the sun light upon a receiver unit mounted above the mirror module in a raised position, with mirror supporting portions of triangular cross-section, wherein a plate is provided at defined intervals with several kinks extending in parallel such that connected-together mirror supporting portions triangular in cross-section including integrated film hinges and foot elements are formed by folding and pushing together, wherein the mirror elements formed in this way are provided with mirror surfaces and attached on a carrier plate.

19. The method according to claim 18, wherein the plate consists substantially of plastic, fibre-reinforced plastic or cardboard strengthened by hardening agents.

* * * * *